US012742066B2

(12) United States Patent
Lee et al.

(10) Patent No.: US 12,742,066 B2
(45) Date of Patent: Sep. 22, 2026

(54) COMPOSITIONS, MULTILAYER FILMS FORMED FROM SUCH COMPOSITIONS, AND ARTICLES

(71) Applicant: Dow Global Technologies LLC, Midland, MI (US)

(72) Inventors: Jong-Young Lee, Sugar Land, TX (US); Yushan Hu, Pearland, TX (US); Michelle Tsui, Houston, TX (US); Brian W. Walther, Lake Jackson, TX (US); Alyssa J. Fielitz, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 671 days.

(21) Appl. No.: 18/246,528

(22) PCT Filed: Nov. 10, 2021

(86) PCT No.: PCT/US2021/058694
§ 371 (c)(1),
(2) Date: Mar. 24, 2023

(87) PCT Pub. No.: WO2022/125248
PCT Pub. Date: Jun. 16, 2022

(65) Prior Publication Data

US 2024/0026143 A1 Jan. 25, 2024

Related U.S. Application Data

(60) Provisional application No. 63/123,152, filed on Dec. 9, 2020.

(51) Int. Cl.

| | |
|---|---|
| ***C08L 33/02*** | (2006.01) |
| ***B32B 27/08*** | (2006.01) |
| ***B32B 27/18*** | (2006.01) |
| ***B32B 27/30*** | (2006.01) |
| ***B32B 27/32*** | (2006.01) |
| ***B32B 27/36*** | (2006.01) |
| ***C08J 5/12*** | (2006.01) |

(52) U.S. Cl.
CPC .............. *C08L 33/02* (2013.01); *B32B 27/08* (2013.01); *B32B 27/18* (2013.01); *B32B 27/306* (2013.01); *B32B 27/308* (2013.01); *B32B 27/32* (2013.01); *B32B 27/36* (2013.01); *C08J 5/121* (2013.01); *C08J 5/124* (2013.01); *B32B 2250/24* (2013.01); *B32B 2270/00* (2013.01); *B32B 2307/31* (2013.01); *B32B 2307/514* (2013.01); *B32B 2307/748* (2013.01); *B32B 2439/70* (2013.01); *C08J 2333/02* (2013.01); *C08J 2423/08* (2013.01); *C08J 2423/14* (2013.01); *C08L 2203/162* (2013.01); *C08L 2205/025* (2013.01); *C08L 2205/03* (2013.01)

(58) Field of Classification Search
CPC ................ C08L 33/02; C08L 2205/03; C08L 2205/025; C08L 2203/16; B32B 27/18; B32B 27/306; B32B 27/308; B32B 27/32; C08J 2423/08; C08J 2423/14
USPC .......................................................... 524/522
See application file for complete search history.

(56) References Cited

U.S. PATENT DOCUMENTS

| | | | |
|---|---|---|---|
| 4,550,141 | A | 10/1985 | Hoh |
| 5,767,184 | A | 6/1998 | May |
| 6,630,237 | B2 | 10/2003 | Rivett et al. |
| 6,849,313 | B2 | 2/2005 | Mechelaere et al. |
| 8,691,916 | B2 | 4/2014 | Wu et al. |
| 10,392,490 | B2 | 8/2019 | Wu et al. |

FOREIGN PATENT DOCUMENTS

| | | |
|---|---|---|
| EP | 3431546 | 1/2019 |
| NZ | 13313 | 10/1987 |
| WO | 9919399 | 4/1999 |
| WO | 2004069920 | 8/2004 |
| WO | 2007044159 | 4/2007 |
| WO | 2016094281 | 6/2016 |
| WO | 2018094197 | 5/2018 |
| WO | 2019035907 | 2/2019 |

OTHER PUBLICATIONS

PCT/US2021/058694, International Search Report and Written Opinion with a mailing date of Feb. 7, 2022.

*Primary Examiner* — Ruiyun Zhang

(57) ABSTRACT

Embodiments of the present invention relate to compositions, multilayer films, and articles. In one aspect, a composition comprises (a) an ionomer that is an acid copolymer comprising ethylene and at least one of acrylic acid and methacrylic acid, wherein a portion of the acid groups in the acid copolymer are neutralized by metal ions and are carboxylic acid salts, and wherein the acid copolymer, prior to neutralization of acid groups by metal ions, comprises 5 to 30 weight percent of acrylic acid and methacrylic acid; (b) an ethylene/unsaturated ester copolymer comprising ethylene vinyl acetate, ethylene acrylate, or a combination thereof; and (c) a propylene-based polymer comprising a copolymer of propylene and a comonomer comprising ethylene, butene, hexene, or octene, wherein the propylene-based polymer has a molecular weight distribution (MWD) of less than 3.0, and a viscosity ratio (viscosity at 0.1 $s^{-1}$/viscosity at 100 $s^{-1}$) of greater than 7.0.

14 Claims, No Drawings

COMPOSITIONS, MULTILAYER FILMS FORMED FROM SUCH COMPOSITIONS, AND ARTICLES

FIELD

This disclosure relates to compositions, multilayer films that include the compositions, and articles that include the compositions or the multilayer films.

INTRODUCTION

Multilayer, flexible films are used in a variety of applications, including, for example, food packaging and specialty packaging. At least one outer layer of a multilayer film is often a sealant layer. The sealant layer, when heated, can adhere multilayer film to other films, other surfaces (e.g., rigid packaging surfaces), or itself. In packaging applications, a strong seal from the sealant layer keeps products fresh and protected. However, for some types of packages, it is desirable for the seal to be peelable such that a consumer does not struggle with opening the package. It is also desirable for such sealant layers to facilitate a clean peel, such that when a consumer peels open the package, the formation of polymer strands or strings during peeling is avoided or minimized. In some film designs, a subskin layer (a layer adjacent to an outer layer) can be designed to facilitate peeling.

There remains a need for new compositions that can be used as sealants that provide a peelable seal strength, a clean peel, and/or mitigates gauge band formation during fabrication.

SUMMARY

The present invention provides compositions that can be used in multilayer films and articles to facilitate opening of articles, such as packages, by peeling. In some embodiments, multilayer films using the inventive compositions in a sealant layer or a subskin layer advantageously have a peelable seal strength and provide a clean peel (avoiding or minimizing the formation of polymer strands or strings during peeling).

In one aspect, the present invention provides a composition that comprises (a) an ionomer that is an acid copolymer comprising ethylene and at least one of acrylic acid and methacrylic acid, wherein a portion of the acid groups in the acid copolymer are neutralized by metal ions and are carboxylic acid salts, and wherein the acid copolymer, prior to neutralization of acid groups by metal ions, comprises 5 to 30 weight percent of acrylic acid and methacrylic acid; (b) an ethylene/unsaturated ester copolymer comprising ethylene vinyl acetate, ethylene acrylate, or a combination thereof; and (c) a propylene-based polymer comprising a copolymer of propylene and a comonomer comprising ethylene, butene, hexene, or octene, wherein the propylene-based polymer has a molecular weight distribution (MWD) of less than 3.0, and a viscosity ratio (viscosity at 0.1 $s^{-1}$/viscosity at 100 $s^{-1}$) of greater than 7.0.

As discussed below, the present invention also provides multilayer films wherein at least one layer comprises any of the inventive compositions disclosed herein. The present invention also provides articles formed from any such multilayer film (i.e., where at least one layer of the multilayer film comprises any of the inventive compositions disclosed herein).

These and other embodiments are discussed in more detailed in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or a polymer mixture, including mixtures of polymers that are formed in situ during polymerization.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

The term, "ethylene/α-olefin interpolymer," as used herein, refers to an interpolymer that comprises, in polymerized form, a majority amount (>50 mol %) of units derived from ethylene monomer, and the remaining units derived from one or more α-olefins. Typical α-olefins used in forming ethylene/α-olefin interpolymers are $C_3$-$C_{10}$ alkenes.

The term, "ethylene/α-olefin copolymer," as used herein, refers to a copolymer that comprises, in polymerized form, a majority amount (>50 mol %) of ethylene monomer, and an α-olefin, as the only two monomer types.

The term "α-olefin", as used herein, refers to an alkene having a double bond at the primary or alpha (α) position.

"Polyethylene" or "ethylene-based polymer" shall mean polymers comprising a majority amount (>50 mol %) of units which have been derived from ethylene monomer. This includes polyethylene homopolymers, ethylene/α-olefin interpolymers, and ethylene/α-olefin copolymers. Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); Medium Density Polyethylene (MDPE); High Density Polyethylene (HDPE); Enhanced Polyethylene; polyethylene elastomers; and polyethylene plastomers. These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems and chromium-based catalyst systems as well as single-site catalysts, including, but not limited to, bis-metallocene catalysts (sometimes referred to as "m-LLDPE"), constrained geometry catalysts (CGC), and molecular catalysts. Resins include linear, substantially linear, or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.940 g/cm$^3$. "MDPE" is typically made using chromium or Ziegler-Natta catalysts or using single-site catalysts including, but not limited to, bis-metallocene catalysts, constrained geometry catalysts, and molecular catalysts, and typically have a molecular weight distribution ("MWD") greater than 2.5.

The term "HDPE" refers to polyethylenes having densities greater than about 0.940 g/cm$^3$ and up to about 0.970 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

"Polyethylene plastomers/elastomers" are substantially linear, or linear, ethylene/α-olefin copolymers containing homogeneous short-chain branching distributions comprising units derived from ethylene and units derived from at least one $C_3$-$C_{10}$ α-olefin comonomer, or at least one $C_4$-$C_8$ α-olefin comonomer, or at least one $C_3$-$C_{10}$ α-olefin comonomer. Polyethylene plastomers/elastomers have a density from 0.870 g/cm$^3$, or 0.880 g/cm$^3$, or 0.890 g/cm$^3$ to 0.900 g/cm$^3$, or 0.902 g/cm$^3$, or 0.904 g/cm$^3$, or 0.909 g/cm$^3$, or 0.910 g/cm$^3$, or 0.917 g/cm$^3$. Nonlimiting examples of polyethylene plastomers/elastomers include AFFINITY™ plastomers and elastomers (available from The Dow Chemical Company), EXACT Plastomers (available from ExxonMobil Chemical), Tafmer (available from Mitsui), Nexlene™ (available from SK Chemicals Co.), and Lucene (available LG Chem Ltd.).

The term "propylene-based polymer," as used herein, refers to a polymer that comprises, in polymerized form, a majority amount of propylene monomer based on the weight of the polymer and, optionally may comprise one or more comonomers.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The present invention provides compositions that can, in some embodiments, be used in multilayer films and articles to facilitate opening of articles, such as packages, by peeling at a desirable seal strength and by providing a clean seal.

In one embodiment, a composition according to the present invention comprises (a) an ionomer that is an acid copolymer comprising ethylene and at least one of acrylic acid and methacrylic acid, wherein a portion of the acid groups in the acid copolymer are neutralized by metal ions and are carboxylic acid salts, and wherein the acid copolymer, prior to neutralization of acid groups by metal ions, comprises 5 to 30 weight percent of acrylic acid and methacrylic acid; (b) an ethylene/unsaturated ester copolymer comprising ethylene vinyl acetate, ethylene acrylate, or a combination thereof; and (c) a propylene-based polymer comprising a copolymer of propylene and a comonomer comprising ethylene, butene, hexene, or octene, wherein the propylene-based polymer has a molecular weight distribution (MWD) of less than 3.0, and a viscosity ratio (viscosity at 0.1 $s^{-1}$/viscosity at 100 $s^{-1}$) of greater than 7.0. In some embodiments, the acid copolymer, prior neutralization of acid groups by metal ions, comprises 5 to 20 weight percent of acrylic acid and methacrylic acid. The acid copolymer, prior neutralization of acid groups by metal ions, in some embodiments, comprises 5 to 15 weight percent of acrylic acid and methacrylic acid.

Regarding the propylene-based polymer, in some embodiments, the propylene-based polymer has a melting point ($T_m$) of greater than 125° C. In some embodiments, the propylene-based polymer is a copolymer of propylene and ethylene, and wherein the ethylene content in the propylene-based polymer is less than 5 weight percent. The propylene-based polymer, in some embodiments, is a copolymer of propylene and ethylene, and wherein the ethylene content in the propylene-based polymer is less than 1 weight percent. In some embodiments, the propylene-based polymer has a melt flow rate of 0.5 to 30 g/10 minutes.

Regarding the ionomer, in some embodiments, the metal ion used to neutralize the acrylic acid or methacrylic acid of the acid copolymer to produce the ionomer comprises zinc, sodium, lithium, magnesium, or a combination thereof. In some embodiments, from 10 to 60 percent of the total acrylic acid and methacrylic acid groups are neutralized by the metal ion based on the total number of acid groups of the acid copolymer. From 10 to 50 percent of the total acrylic acid and methacrylic acid groups, in some embodiments, are neutralized by the metal in the ionomer. In some embodiments, from 10 to 40 percent of the total acrylic acid and methacrylic acid groups are neutralized by the metal in the ionomer.

Regarding the ethylene/unsaturated ester copolymer, in some embodiments, the ethylene/unsaturated ester copolymer is ethylene vinyl acetate, and the ethylene vinyl acetate comprises 8 to 30 weight percent vinyl acetate. In some embodiments, the ethylene/unsaturated ester copolymer is ethylene vinyl acetate, and the ethylene vinyl acetate comprises 12 to 30 weight percent vinyl acetate or, in other embodiments, 20 to 30 weight percent vinyl acetate. In some embodiments, the ethylene/unsaturated ester copolymer is ethylene acrylate, and the ethylene acrylate comprises 8 to 25 weight percent acrylate. In some embodiments, the ethylene/unsaturated ester copolymer is ethylene acrylate, and the ethylene acrylate comprises 12 to 25 weight percent acrylate or, in other embodiments, 17 to 25 weight percent acrylate.

In some embodiments, the composition comprises 40 to 70 weight percent of the ionomer based on the total weight of the composition. The composition, in some embodiments, comprises 50 to 65 weight percent of the ionomer based on the total weight of the composition. In some embodiments, the composition comprises 10 to 40 weight percent of the ethylene/unsaturated ester copolymer based on the total weight of the composition. The composition, in some embodiments, comprises 15 to 30 weight percent of the ethylene/unsaturated ester copolymer based on the total weight of the composition. In some embodiments, the composition comprises 5 to 30 weight percent of the propylene-based polymer based on the total weight of the composition. The composition, in some embodiments, comprises 5 to 25 weight percent of the propylene-based polymer based on the total weight of the composition.

In some embodiments, the ratio of the weight percent of ionomer in the composition to the weight percent of the propylene-based polymer in the composition is 1.3 to 15.0. The ratio of the weight percent of ionomer in the composition to the weight percent of the propylene-based polymer in the composition, in some embodiments, is 2.0 to 14.0. In some embodiments, the ratio of the weight percent of ionomer in the composition to the weight percent of the propylene-based polymer in the composition is 2.8 to 13.0.

The present invention also provides multilayer films wherein at least one layer comprises any of the inventive compositions disclosed herein. In some embodiments, the composition is an outer layer of the multilayer film. In some embodiments, the composition is in a layer adjacent to an outer layer (e.g., in a subskin layer).

The present invention also provides articles formed from any such multilayer film (i.e., where at least one layer of the multilayer film comprises any of the inventive compositions disclosed herein).

Ionomers

Compositions according to embodiments of the present invention comprise an ionomer that is an acid copolymer comprising ethylene and at least one of acrylic acid and methacrylic acid, wherein a portion of the acid groups in the acid copolymer are neutralized by metal ions and are carboxylic acid salts. For ease of reference, the acid copolymer comprising ethylene and at least one of acrylic acid and methacrylic acid will also be referred to herein as "ethylene/(meth)acrylic acid copolymer" with the understanding that some such copolymers can comprise both acrylic acid monomer and methacrylic acid monomer.

Ionomers are ionically crosslinked thermoplastics generally obtained by neutralizing a copolymer containing pendant acid groups (e.g., carboxylic acid groups) with an ionizable metal compound (e.g., a compound of the monovalent, divalent and/or trivalent metals of Group I, II, IV-A and VIIIB of the periodic table of the elements).

In embodiments of the present invention, the ionomers are an acid copolymers comprising ethylene and at least one of acrylic acid and methacrylic acid, wherein a portion of the acid groups in the acid copolymer are neutralized by metal ions and are carboxylic acid salts. In some embodiments, the acid copolymer, prior to neutralization of acid groups by metal ions, comprises 5 to 30 weight percent of acrylic acid and methacrylic acid. In other words, if the acid copolymer comprises ethylene and only acrylic acid, then the amount of acrylic acid in the acid copolymer, prior to neutralization of acid groups by metal ions, is 5 to 30 weight percent; if the acid copolymer comprises ethylene and only methacrylic acid, then the amount of methacrylic acid in the acid copolymer, prior to neutralization of acid groups by metal ions, is 5 to 30 weight percent; if the acid copolymer comprises ethylene and both acrylic acid and methacrylic acid, then the total amount of acrylic acid and methacrylic acid in the acid copolymer, prior to neutralization of acid groups by metal ions, is 5 to 30 weight percent.

In some embodiments, the acid copolymer, prior neutralization of acid groups by metal ions, comprises 5 to 20 weight percent of acrylic acid and methacrylic acid. In other words, if the acid copolymer comprises ethylene and only acrylic acid, then the amount of acrylic acid in the acid copolymer, prior to neutralization of acid groups by metal ions, is 5 to 20 weight percent; if the acid copolymer comprises ethylene and only methacrylic acid, then the amount of methacrylic acid in the acid copolymer, prior to neutralization of acid groups by metal ions, is 5 to 20 weight percent; if the acid copolymer comprises ethylene and both acrylic acid and methacrylic acid, then the total amount of acrylic acid and methacrylic acid in the acid copolymer, prior to neutralization of acid groups by metal ions, is 5 to 20 weight percent.

The acid copolymer, prior neutralization of acid groups by metal ions, in some embodiments, comprises 5 to 15 weight percent of acrylic acid and methacrylic acid. In other words, if the acid copolymer comprises ethylene and only acrylic acid, then the amount of acrylic acid in the acid copolymer, prior to neutralization of acid groups by metal ions, is 5 to 15 weight percent; if the acid copolymer comprises ethylene and only methacrylic acid, then the amount of methacrylic acid in the acid copolymer, prior to neutralization of acid groups by metal ions, is 5 to 15 weight percent; if the acid copolymer comprises ethylene and both acrylic acid and methacrylic acid, then the total amount of acrylic acid and methacrylic acid in the acid copolymer, prior to neutralization of acid groups by metal ions, is 5 to 15 weight percent.

The ethylene/(meth)acrylic acid copolymer used to form the ionomer can be characterized as a random copolymer. Such ethylene/(meth)acrylic acid copolymers can be prepared at high pressure by the action of a free-radical polymerization initiator, acting on a mixture of ethylene and acrylic acid and/or methacrylic acid monomers using techniques known to those of skill in the art. The ethylene/(meth)

acrylic acid copolymers used in compositions of the present invention are more precisely referred to as interpolymers because they are formed by the polymerization of a mixture of the comonomers, in contradistinction to copolymers made by "grafting" or "block-polymerization" methods.

The ionomers used in compositions of the present invention are obtained by reacting the foregoing copolymers with a sufficient amount of metal ions as to neutralize at least some portion of the acid groups, preferably at least 10 percent of the acid groups present based on the total number of acid groups of the acid copolymer. In some embodiments, from 10 to 60 percent of the total acrylic acid and methacrylic acid groups, based on the total number of acid groups of the acid copolymer, are neutralized by the metal ion. From 10 to 50 percent of the total acrylic acid and methacrylic acid groups, based on the total number of acid groups of the acid copolymer, are neutralized by the metal ion in some embodiments. In some embodiments, from 10 to 40 percent of the total acrylic acid and methacrylic acid groups, based on the total number of acid groups of the acid copolymer, are neutralized by the metal ion. Suitable metal ions include zinc ($Zn^{+2}$), sodium ($Na^{+}$), lithium ($Li^{+}$), magnesium ($Mg^{+2}$), or a combination thereof. One or more ionomers may be used in some embodiments.

The ionomer may further be characterized as having a melt index ($I_2$) of 0.5 to 60 g/10 minutes in some embodiments. All individual values and subranges between 0.5 and 60 g/10 minutes are included herein and disclosed herein. For example, the ionomer can have a melt index from a lower limit of 0.5, 1, 5, 10, 15, or 20 g/10 minutes to an upper limit of 10, 15, 20, 25, 30, 35, 40, 45, 50, or 55 g/10 minutes. In some embodiments, the ionomer has a melt index ($I_2$) of 0.5 to 40 g/10 minutes, and 0.5 to 30 g/10 minutes in some embodiments. The ionomer has a melt index ($I_2$) of 0.5 to 15 g/10 minutes in some embodiments.

The composition comprises 40 to 70 weight percent ionomer based on the weight of the composition in some embodiments. In some embodiments, the composition comprises at least 50 weight percent ionomer based on the weight of the composition in some embodiments. In some embodiments, the composition comprises up to 65 weight percent of the ionomer based on the weight of the composition. All individual values and subranges from 40 to 70 wt % are included and disclosed herein; for example, the amount of ionomer in the composition can be from a lower limit of 45, 50, 50, 55, or 60 wt % to an upper limit of 60, 65, or 70 wt %. For example, the amount of ionomer in the composition can be from 50 to 65 wt %, based on the weight of the composition.

Examples of commercially available ionomers of ethylene/(meth)acrylic acid copolymers that can be used in embodiments of the present invention include SURLYN™ ionomers commercially available from The Dow Chemical Company, such as SURLYN™ 1650SB, SURLYN™ 1706, SURLYN™ 1702, SURLYN™ 1605, and SURLYN™ 1707.

The ionomer of ethylene/(meth)acrylic acid copolymer may have a combination of two or more properties of the above embodiments.

Ethylene/Unsaturated Ester Copolymer

In addition to an ionomer of ethylene/(meth)acrylic acid copolymer, compositions of the present invention further comprise an ethylene/unsaturated ester copolymer. The ethylene/unsaturated ester copolymer is a copolymer or interpolymer comprising ethylene and at least one monomer which is an ester and has unsaturation, preferably at least one double bond interpolymerizable with the ethylene. The ester is preferably a carboxylic acid ester and is referred to herein as an unsaturated ester. Either the acid moiety or the alcohol moiety of the ester is optionally unsaturated, or both. Examples of unsaturated esters wherein the acid moiety is unsaturated include acrylates and methacrylates. In some embodiments, these esters are alkyl esters such as methyl acrylate, ethyl acrylate, and butyl acrylate. Examples of unsaturated esters wherein the alcohol moiety is unsaturated include vinyl esters, such as vinyl acetate as well as vinyl propionate, vinyl butyrate, and vinyl hexanoate.

The ethylene/unsaturated ester copolymers may further be characterized as having a melt index ($I_2$) of 0.5 to 60 g/10 minutes in some embodiments. All individual values and subranges between 0.5 and 60 g/10 minutes are included herein and disclosed herein. For example, the ethylene/unsaturated ester copolymers can have a melt index from a lower limit of 0.5, 1, 5, 10, 15, or 20 g/10 minutes to an upper limit of 10, 15, 20, 25, 30, 35, 40, 45, 50, or 55 g/10 minutes. In some embodiments, the ethylene/unsaturated ester copolymers has a melt index ($I_2$) of 0.5 to 40 g/10 minutes, and 0.5 to 30 g/10 minutes in some embodiments. The ethylene/unsaturated ester copolymers has a melt index ($I_2$) of 0.5 to 15 g/10 minutes in some embodiments.

Ethylene/unsaturated ester copolymers where the unsaturated ester is a vinyl ester are well known and commercially available from a variety of sources. In one embodiment, the ethylene/unsaturated ester copolymer is ethylene vinyl acetate. Non-limiting examples of ethylene vinyl acetate that can be used in some embodiments of the present invention include ELVAX™ ethylene vinyl acetate copolymers commercially available from The Dow Chemical Company such as ELVALX™ 650Q.

In some embodiments where the ethylene unsaturated ester copolymer is ethylene vinyl acetate, the composition comprises 8 to 40 weight percent ethylene vinyl acetate based on the total weight of the composition. The composition, in some embodiments, comprises 8 to 30 weight percent ethylene vinyl acetate based on the total weight of the composition. In some embodiments, the composition comprises 12 to 30 weight percent ethylene vinyl acetate based on the total weight of the composition. The composition, in some embodiments, comprises 20 to 30 weight percent ethylene vinyl acetate based on the total weight of the composition.

Ethylene/unsaturated ester copolymers where the unsaturated ester is an acrylate (e.g., methyl acrylate, ethyl acrylate, butyl acrylate, etc.) are well known and commercially available from a variety of sources. In one embodiment, the ethylene/unsaturated ester copolymer is ethylene methyl acrylate. Non-limiting examples of ethylene acrylates that can be used in some embodiments of the present invention include ELVALOY™ AC ethylene acrylate copolymers commercially available from The Dow Chemical Company such as ELVALOY™ AC 1820 and ELVALOY™ AC 1224.

In some embodiments where the ethylene/unsaturated ester copolymer is ethylene acrylate, the composition comprises 8 to 40 weight percent ethylene acrylate based on the total weight of the composition. The composition, in some embodiments, comprises 8 to 25 weight percent ethylene acrylate based on the total weight of the composition. In some embodiments, the composition comprises 12 to 25 weight percent ethylene acrylate based on the total weight of the composition. The composition, in some embodiments, comprises 17 to 25 weight percent ethylene acrylate based on the total weight of the composition.

The ethylene/unsaturated ester copolymer may have a combination of two or more properties of the above embodiments.

Propylene-Based Polymer

In addition to an ionomer of ethylene/(meth)acrylic acid copolymer and an ethylene/unsaturated ester copolymer, compositions of the present invention further comprise a propylene-based polymer comprising copolymer of propylene and a comonomer comprising ethylene, butene, hexene, or octene and having certain properties. The propylene-based polymer has a molecular weight distribution (MWD) of less than 3.0, and a viscosity ratio (viscosity at 0.1 $s^{-1}$/viscosity at 100 $s^{-1}$) of greater than 7.0.

In some embodiments, the molecular weight distribution ($M_w/M_n$, referred to as MWD), of the propylene-based polymer is from 2.0 to 3.0. The MWD of polypropylene is determined using Gel Permeation Chromatography (GPC) as described in the Test Methods section below. In some embodiments, the MWD is from 2.3 to 2.9, or from 2.4 to 2.9. In some of the foregoing embodiments, the propylene-based polymer is a copolymer comprising propylene and ethylene.

In some embodiments, the viscosity ratio (viscosity at 0.1 $s^{-1}$/viscosity at 100 $s^{-1}$) of the propylene is based polymer is greater than 7.0 and up to 10.0. In some embodiments, the viscosity ratio is from 7.3 to 9.5, or from 7.4 to 9.5. In some of the foregoing embodiments, the propylene-based polymer is a copolymer comprising propylene and ethylene.

In some embodiments, the propylene-based polymer has a melting temperature ($T_m$) of greater than 1250° C., as measured by DSC. In some embodiments, the propylene-based polymer has a melting temperature ($T_m$) from 125° C. to 140° C., or from 125° C. to 135° C., as measured by DSC. In some of the foregoing embodiments, the propylene-based polymer is a copolymer comprising propylene and ethylene.

In some embodiments, the propylene-based polymer has a melt flow rate (MFR), at 230° C. and 2.16 kg load (ASTM D-1238), of ≥0.5 g/10 min, or ≥1.0 g/10 min, or ≥2.0 g/min. In some embodiments, the propylene-based polymer has a melt flow rate (MFR), at 230° C. and 2.16 kg load (ASTM D-1238), of ≤30 g/10 min, or ≤20 g/10 min, or ≤15 g/10 min. In some embodiments, the propylene-based polymer has a melt flow rate (MFR), at 230° C. and 2.16 kg load (ASTM D-1238), of 0.5 to 30 g/10 min, or from 1 to 20 g/10 min, or from 1 to 15 g/10 min, or from 1 to 10 g/10 min, or from 5 to 10 g/10 min. In some of the foregoing embodiments, the propylene-based polymer is a copolymer comprising propylene and ethylene.

In some embodiments, the propylene-based polymer has a density ≥0.860 g/$cm^3$, or ≥0.870 g/$cm^3$, or ≥0.875 g/$cm^3$, or ≥0.880 g/$cm^3$, or ≥0.885 g/$cm^3$. In some embodiments, the propylene-based polymer has a density ≤0.910 g/$cm^3$, or ≤0.905 g/$cm^3$, or ≤0.900 g/$cm^3$. In some embodiments, the propylene-based polymer has a density from 0.860 g/$cm^3$ to 0.910 g/$cm^3$, or from 0.870 g/$cm^3$ to 0.905 g/$cm^3$, or from 0.880 g/$cm^3$ to 0.900 g/$cm^3$. In some of the foregoing embodiments, the propylene-based polymer is a copolymer comprising propylene and ethylene.

In some embodiments, the propylene-based polymer is a copolymer comprising propylene and ethylene. In some such embodiments, the ethylene content in the propylene-based polymer is less than 5 weight percent. In some such embodiments, the ethylene content in the propylene-based polymer is less than 1 weight percent.

The composition comprises 5 to 30 weight percent propylene-based polymer based on the weight of the composition in some embodiments. In some embodiments, the composition comprises at least 5 weight percent propylene-based polymer based on the weight of the composition in some embodiments. In some embodiments, the composition comprises up to 30 weight percent of the propylene-based based on the weight of the composition. All individual values and subranges from 5 to 30 wt % are included and disclosed herein; for example, the amount of propylene-based polymer in the composition can be from a lower limit of 5, 10, 15, or 18 wt % to an upper limit of 20, 25, or 30 wt %. For example, the amount of propylene-based polymer in the composition can be from 5 to 25 wt %, based on the weight of the composition, in some embodiments.

Examples of commercially available propylene-based polymers that can be used in embodiments of the present invention include VERSIFY™ propylene-based polymers commercially available from The Dow Chemical Company, such as VERSIFY™ 2000 and VERSIFY™ 3000.

The propylene-based polymer may have a combination of two or more properties of the above embodiments.

The ratio of the amount of ionomer in the composition to the amount of the propylene-based polymer can be important in some embodiments. In some embodiments, the ratio of the weight percent of ionomer in the composition to the weight percent of the propylene-based polymer in the composition is 1.3 to 15.0. The ratio of the weight percent of ionomer in the composition to the weight percent of the propylene-based polymer in the composition, in some embodiments, is 2.0 to 14.0. In some embodiments, the ratio of the weight percent of ionomer in the composition to the weight percent of the propylene-based polymer in the composition is 2.8 to 13.0.

Additives

In one or more embodiments, the presently-disclosed compositions may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, and combinations thereof. The compositions may contain from about 0.1 to about 10 percent by the combined weight of such additives, based on the weight of the composition including such additives.

One example of a composition according to some embodiments of the present invention comprises (a) from 40 to 70 weight percent (based on the total weight of the composition) of an ionomer that is an acid copolymer comprising ethylene and at least one of acrylic acid and methacrylic acid, wherein a portion of the acid groups in the acid copolymer are neutralized by metal ions and are carboxylic acid salts, and wherein the acid copolymer, prior to neutralization of acid groups by metal ions, comprises 5 to 30 weight percent of acrylic acid and methacrylic acid; (b) from 8 to 30 weight percent (based on the total weight of the composition) of an ethylene/unsaturated ester copolymer comprising ethylene vinyl acetate, ethylene acrylate, or a combination thereof; and (c) from 5 to 30 weight percent (based on the total weight of the composition) of a propylene-based polymer comprising a copolymer of propylene and a comonomer comprising ethylene, butene, hexene, or octene, wherein the propylene-based polymer has a molecular weight distribution (MWD) of less than 3.0, and a viscosity ratio (viscosity at 0.1 $s^{-1}$/viscosity at 100 $s^{-1}$) of greater than 7.0.

Another example of a composition according to some embodiments of the present invention comprises (a) from 50 to 65 weight percent (based on the total weight of the composition) of an ionomer that is an acid copolymer comprising ethylene and at least one of acrylic acid and methacrylic acid, wherein a portion of the acid groups in the acid copolymer are neutralized by metal ions and are carboxylic acid salts, and wherein the acid copolymer, prior to neutralization of acid groups by metal ions, comprises 5 to 30 weight percent of acrylic acid and methacrylic acid; (b) from 15 to 30 weight percent (based on the total weight of the composition) of an ethylene/unsaturated ester copolymer comprising ethylene vinyl acetate, ethylene acrylate, or a combination thereof; and (c) from 5 to 25 weight percent (based on the total weight of the composition) of a propylene-based polymer comprising a copolymer of propylene and a comonomer comprising ethylene, butene, hexene, or octene, wherein the propylene-based polymer has a molecular weight distribution (MWD) of less than 3.0, and a viscosity ratio (viscosity at 0.1 $s^{-1}$/viscosity at 100 $s^{-1}$) of greater than 7.0.

Another example of a composition according to some embodiments of the present invention comprises (a) from 40 to 70 weight percent (based on the total weight of the composition) of an ionomer that is an acid copolymer comprising ethylene and at least one of acrylic acid and methacrylic acid, wherein a portion of the acid groups in the acid copolymer are neutralized by metal ions and are carboxylic acid salts, and wherein the acid copolymer, prior to neutralization of acid groups by metal ions, comprises 5 to 30 weight percent of acrylic acid and methacrylic acid; (b) from 8 to 30 weight percent (based on the total weight of the composition) of an ethylene/unsaturated ester copolymer comprising ethylene vinyl acetate, ethylene acrylate, or a combination thereof; and (c) from 5 to 30 weight percent (based on the total weight of the composition) of a propylene-based polymer comprising a copolymer of propylene and ethylene, wherein the ethylene content in the propylene-based polymer is less than 5 weight percent, and wherein the propylene-based polymer has a molecular weight distribution (MWD) of less than 3.0 and a viscosity ratio (viscosity at 0.1 $s^{-1}$/viscosity at 100 $s^{-1}$) of greater than 7.0.

Another example of a composition according to some embodiments of the present invention comprises (a) from 50 to 65 weight percent (based on the total weight of the composition) of an ionomer that is an acid copolymer comprising ethylene and at least one of acrylic acid and methacrylic acid, wherein a portion of the acid groups in the acid copolymer are neutralized by metal ions and are carboxylic acid salts, and wherein the acid copolymer, prior to neutralization of acid groups by metal ions, comprises 5 to 30 weight percent of acrylic acid and methacrylic acid; (b) from 15 to 30 weight percent (based on the total weight of the composition) of an ethylene/unsaturated ester copolymer comprising ethylene vinyl acetate, ethylene acrylate, or a combination thereof; and (c) from 5 to 25 weight percent (based on the total weight of the composition) of a propylene-based polymer comprising a copolymer of propylene and ethylene, wherein the ethylene content in the propylene-based polymer is less than 5 weight percent, and wherein the propylene-based polymer has a molecular weight distribution (MWD) of less than 3.0 and a viscosity ratio (viscosity at 0.1 $s^{-1}$/viscosity at 100 $s^{-1}$) of greater than 7.0.

Another example of a composition according to some embodiments of the present invention comprises (a) from 50 to 65 weight percent (based on the total weight of the composition) of an ionomer that is an acid copolymer comprising ethylene and at least one of acrylic acid and methacrylic acid, wherein a portion of the acid groups in the acid copolymer are neutralized by metal ions and are carboxylic acid salts, wherein the acid copolymer, prior to neutralization of acid groups by metal ions, comprises 5 to 30 weight percent of acrylic acid and methacrylic acid, and wherein from 10 to 50 percent of the total acrylic acid groups and methacrylic acid groups of the acid copolymer, based on the total number of acid groups of the acid copolymer, are neutralized by the metal ion; (b) from 15 to 30 weight percent (based on the total weight of the composition) of ethylene vinyl acetate; and (c) from 5 to 25 weight percent (based on the total weight of the composition) of a propylene-based polymer comprising a copolymer of propylene and ethylene, wherein the ethylene content in the propylene-based polymer is less than 5 weight percent, wherein the propylene-based polymer has a molecular weight distribution (MWD) of less than 3.0 and a viscosity ratio (viscosity at 0.1 $s^{-1}$/viscosity at 100 $s^{-1}$) of greater than 7.0, and wherein the ratio of the weight percent of ionomer in the composition to the weight percent of the propylene-based polymer in the composition is 1.3 to 13.0.

Another example of a composition according to some embodiments of the present invention comprises (a) from 50 to 65 weight percent (based on the total weight of the composition) of an ionomer that is an acid copolymer comprising ethylene and at least one of acrylic acid and methacrylic acid, wherein a portion of the acid groups in the acid copolymer are neutralized by metal ions and are carboxylic acid salts, wherein the acid copolymer, prior to neutralization of acid groups by metal ions, comprises 5 to 30 weight percent of acrylic acid and methacrylic acid, and wherein from 10 to 50 percent of the total acrylic acid groups and methacrylic acid groups of the acid copolymer, based on the total number of acid groups of the acid copolymer, are neutralized by the metal; (b) from 15 to 30 weight percent (based on the total weight of the composition) of ethylene vinyl acetate; and (c) from 5 to 25 weight percent (based on the total weight of the composition) of a propylene-based polymer comprising a copolymer of propylene and ethylene, wherein the ethylene content in the propylene-based polymer is less than 5 weight percent, wherein the propylene-based polymer has a molecular weight distribution (MWD) of less than 3.0 and a viscosity ratio (viscosity at 0.1 $s^{-1}$/viscosity at 100 $s^{-1}$) of greater than 7.0, and wherein the ratio of the weight percent of ionomer in the composition to the weight percent of the propylene-based polymer in the composition is 1.3 to 13.0.

Multilayer Films

The present invention also relate to multilayer films formed from any of the inventive compositions as described herein. In some embodiments, the film is a blown film or a cast film. In some embodiments of multilayer films that include the presently-disclosed compositions, a multilayer film may include a composition of the present invention in an outer layer and/or in a layer adjacent to the outer layer. In some embodiments, compositions of the present invention may be used to provide a sealant layer in a multilayer film. For example, an inventive composition may be in an outer layer of a multilayer film formed by coextrusion through a blown film or cast film process. A sealant layer may provide a heat-sealable surface. As used herein, a heat-sealable surface is a surface that may allow the surface of the film to be heat-sealed to another surface of the same film or to the surface of another film or substrate.

The amount of the inventive composition to use in films of the present invention can depend on a number of factors including, for example, the other layers in the film, the end use application of the film, and others. In some embodiments, a multilayer film comprises a layer consisting essentially of a composition of the present invention. In some embodiments, a multilayer film comprises a layer consisting of a composition of the present invention.

Multilayer films of the present invention can have a variety of thicknesses. The thickness of the film can depend on a number of factors including, for example, the other layers in the film if it is a multilayer film, the desired properties of the film, the end use application of the film, the equipment available to manufacture the film, and others. In some embodiments, a film of the present disclosure has a thickness of up to 10 mils. For example, the film can have a thickness from a lower limit of 0.25 mils, 0.5 mils, 0.7 mils, 1.0 mil, 1.75 mils, or 2.0 mils to an upper limit of 4.0 mils, 6.0 mils, 8.0 mils, or 10 mils. In embodiments, the film can have a thickness from 0.25 mils, to 2.0 mils, from 0.25 mils to 1.75 mils, from 0.25 mils to 1.0 mils, from 0.25 mils to 0.7 mils, from 0.25 mils to 0.5 mils, from 0.5 mils, to 2.0 mils, from 0.5 mils to 1.75 mils, from 0.5 mils to 1.0 mils, from 0.5 mils to 0.7 mils, from 0.7 mils, to 2.0 mils, from 0.7 mils to 1.75 mils, from 0.7 mils to 1.0 mils, from 1.0 mils, to 2.0 mils, from 1.0 mils to 1.75 mils, from 1.75 mils, to 2.0 mils, or any combinations.

In some embodiments of a multilayer film comprising at least one layer comprising a composition of the present invention, the layer or layers comprising inventive composition have a thickness that is 5 to 30% of the total thickness of the multilayer film.

In some embodiments, the number of layers in the film can depend on a number of factors including, for example, the desired properties of the film, the desired thickness of the film, the content of the other layers of the film, the end use application of the film, the equipment available to manufacture the film, and others. A multilayer blown film can comprise up to 2, 3, 4, 5, 6, 7, 8, 9, 10, or 11 layers in various embodiments.

The compositions of the present invention, in some embodiments, can be used in more than one layer of the film. Other layers within a multilayer film of the present disclosure can comprise, in various embodiments, a LLDPE, a VLDPE (a very low density polyethylene), a MDPE, a LDPE, a HDPE, a HMWHDPE (a high molecular weight HDPE), a propylene-based polymer, a polyolefin plastomer (POP), a polyolefin elastomer (POE), an olefin block copolymer (OBC), an ethylene vinyl acetate, an ethylene acrylic acid, an ethylene methacrylic acid, an ethylene methyl acrylate, an ethylene ethyl acrylate, an ethylene butyl acrylate, an isobutylene, a maleic anhydride-grafted polyolefin, an ionomer of any of the foregoing, or a combination thereof. In some embodiments, a multilayer film of the present disclosure can comprise one or more tie layers known to those of skill in the art.

In additional embodiments of the multilayer films described herein, other layers may be adhered to, for example, a polyethylene film by a tie layer (sometimes in addition to a barrier layer). A tie layer may be used to adhere layers of dissimilar materials. For example, a barrier layer comprising ethylene vinyl alcohol (EVOH) may be adhered to a polyethylene material by a tie layer (i.e. a tie layer comprising maleic anhydride grafted polyethylene). For example, the multilayer film can further comprise other layers typically included in multilayer films depending on the application including, for example, other barrier layers, structural or strength layers, sealant layers, other tie layers, other polyethylene layers, polypropylene layers, etc. In additional embodiments, a printed layer may be included that may be an ink layer, which is applied to the film, to show product details and other packaging information in various colors.

It should be understood that any of the foregoing layers can further comprise one or more additives as known to those of skill in the art such as, for example, antioxidants, ultraviolet light stabilizers, thermal stabilizers, slip agents, antiblocks, pigments or colorants, processing aids, crosslinking catalysts, flame retardants, fillers and foaming agents. In some embodiments, the layers comprise up to 5 weight percent of such additional additives.

In some embodiments, a multilayer film comprising a layer formed from an inventive composition described herein can be laminated to another film substrate. Substrates may include films comprising polyester, nylon, polypropylene, polyethylene, and combinations. In some embodiments, a biaxially oriented polyethylene (BOPE) substrate, a machine direction oriented polyethylene (MDO) substrate, or a coextruded polyethylene film may be included in the laminate structure.

Multilayer films of the present invention, in some embodiments, can be corona treated and/or printed (e.g., reverse or surface printed) using techniques known to those of skill in the art.

In some embodiments, multilayer films of the present invention can be oriented, uniaxially (e.g., in the machine direction) or biaxially, using techniques known to those of skill in the art.

Articles

Embodiments of the present invention also relate to articles, such as packages, formed from or incorporating any of the inventive compositions disclosed herein (i.e., through multilayer films incorporating such compositions). Such packages can be formed from any of the inventive compositions disclosed herein (i.e., through films incorporating such compositions).

Examples of such articles can include flexible packages, pouches, stand-up pouches, and pre-made packages or pouches. In some embodiments, multilayer films of the present invention can be used for food packages. Examples of food that can be included in such packages include meats, cheeses, cereal, nuts, snacks, juices, sauces, and others. Such packages can be formed using techniques known to those of skill in the art based on the teachings herein and based on the particular use for the package (e.g., type of food, amount of food, etc.).

When incorporated in articles, such as packages, compositions of the present invention can, in some embodiments, provide a peelable seal strength, a clean peel (e.g., no formation of polymer strands or strings during peeling), and/or consistent peel strength at different seal temperatures, and seal through oil contamination. In some embodiments, the use of such compositions can advantageously mitigate or eliminate the formation of gauge bands during film fabrication.

Test Methods

Unless otherwise indicated herein, the following analytical methods are used in describing aspects of the present invention:

Melt Index

Melt indices $I_2$ (or I2) and $I_{10}$ (or I10) were measured in accordance with ASTM D-1238 (method B) at 190° C. and at 2.16 kg and 10 kg load, respectively. Their values are reported in g/10 min. Melt flow rates for propylene-based polymers were measured in accordance with ASTM D-1238 at 230° C. and at 2.16 kg.

Density

Samples for density measurement were prepared according to ASTM D4703. Measurements were made, according to ASTM D792, Method B, within one hour of sample pressing.

Comonomer Content

The comonomer content in copolymers (e.g., the amount of acrylate in ethylene acrylate) is determined based on ASTM E168.

Differential Scanning Calorimetry (DSC)

Differential Scanning Calorimetry (DSC) is used to measure melting and crystallization behavior of polymers (e.g., ethylene-based polymers and propylene-based polymers). A sample is first melt pressed (25000 lbs for about 10 sec) into a thin film, at about 190° C., and then cooled to room temperature. About 5 mg to 8 mg of polymer film sample is cut with a die punch and is weighed and placed into a DSC pan. The lid is crimped on the pan to ensure a closed atmosphere. The sample pan is placed into a calibrated DSC cell purged with nitrogen gas, and then heated at a rate of approximately 10° C./min, to a temperature of 180° C. for PE (230° C. for PP). The sample is kept at this temperature for three minutes. Then the sample is cooled at a rate of 10° C./min to −40° C., to record the crystallization trace, and kept isothermally at that temperature for three minutes. The sample is next reheated at a rate of 10° C./min, until complete melting. Unless otherwise stated, peak melting point ($T_m$) is determined from the second heating curve, and corresponds to the temperature of the highest peak (intensity) in the endotherm. The crystallization temperature ($T_c$) is determined from the cooling curve (peak $T_c$). The $T_g$ is measured from the second heating curve, and determined at the midpoint of the inflection transition.

Gel Permeation Chromatography (GPC)

The gel permeation chromatographic system consists of either a Polymer Laboratories Model PL-210 or a Polymer Laboratories Model PL-220 instrument. The column and carousel compartments are operated at 150° C. Four Polymer Laboratories (now Agilent) 20-micron Mixed-A columns are used in series, and the solvent is 1,2,4 trichlorobenzene. The samples are prepared at a concentration 2 mg/mL of solvent containing 200 ppm of butylated hydroxytoluene (BHT). Samples are prepared by agitating lightly for 2 hours at 160° C. The injection volume used is 200 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polypropylene molecular weights using the following equation (as described in Williams and Ward, J. Polym. Sci., Polym. Let., 6, 621 (1968)):

$$M_{polypropylene}=0.645(M_{polystyrene}) \quad \text{(EQ 1).}$$

The calculations of $Mn_{(GPC)}$ and $Mw_{(GPC)}$ were based on GPC results using the internal IR5 detector (measurement channel) of the PolymerChar GPC-IR chromatograph according to Equations 2-3, using PolymerChar GPCOne™ software, the baseline-subtracted IR chromatogram at each equally-spaced data collection point (i), and the polypropylene equivalent molecular weight obtained from the narrow standard calibration curve for the point (i) from Equation 1 (EQ 1)

$$Mn = \frac{\sum^{i} IR_i}{\sum^{i}\left(IR_i / M_{polypropylene_i}\right)} \quad \text{(EQ 2)}$$

$$Mw = \frac{\sum^{i}\left(IR_i * M_{polypropylene_i}\right)}{\sum^{i} IR_i} \quad \text{(EQ 3)}$$

Molecular weight distribution (MWD) is defined as the weight average molecular weight divided by the number average molecular weight ($M_w/M_n$).

Dynamic Mechanical Spectroscopy (DMS)

Viscosity measurements were conducted by the TA instrument ARES in a parallel plate. Samples were compression molded at 1900° C., for 6.5 minutes at a pressure of 25000 lbs in air, and the plaques were subsequently allowed to cool down on lab bench. Plaque thickness was ~3 mm. Constant temperature frequency sweep measurements were performed on an ARES strain controlled parallel plate rheometer (TA Instruments) equipped with 25 mm parallel plates, under a nitrogen purge. For each measurement, the rheometer was thermally equilibrated for at least 30 minutes prior to zeroing the gap. The sample was placed on the plate and allowed to melt for five minutes at 190° C. or 220° C. The plates were then closed to 2 mm, the sample trimmed, and then the test was started. The method had an additional five minute delay built in, to allow for temperature equilibrium. The experiments were performed at 190° C. or 220° C. over a frequency range of 0.1-100 rad/s at five points per decade interval. The strain amplitude was constant at 5%. The stress response was analyzed in terms of amplitude and phase, from which the storage modulus (G'), loss modulus (G"), complex modulus (G*), dynamic complex viscosity (η*), and tan (δ) or tan delta were calculated.

Some embodiments of the invention will now be described in detail in the following Examples.

EXAMPLES

The following materials are used to make a variety of inventive and comparative compositions as discussed further below:

TABLE 1

| Type | Product Name | Density (g/cm$^3$) | $I_2$ or Melt Flow Rate (g/10 min)* | MWD | Melting Point, $T_m$ (° C.) | Crystal. Temp., $T_c$ (° C.) | Wt % of $C_2$ comonomer |
|---|---|---|---|---|---|---|---|
| Propylene-based Polymer | VERSIFY ™ 3000 | 0.891 | 8 | 2.67 | 118° C. | 82 | 4.5 |
| | VERSIFY ™ 2000 | 0.888 | 2 | 2.43 | 107° C. | 71 | 4.3 |
| | RCPP-1 | 0.898 | 8.0 | 2.71 | 131° C. | 97 | 0.5 |
| | DS6D81 | 0.900 | 5.0 | 4.42 | 135° C. | 97 | 4.3 |
| | D115A | 0.900 | 11 | 5.76 | 162° C. | 116 | 0 |
| Polyethylene | DOW ™ DMDA-8904 | 0.952 | 4.0 | NA | NA | NA | NA |
| | ELITE ™ 5960 | 0.962 | 0.85 | NA | NA | NA | NA |
| | DOWLEX ™ 2045G | 0.920 | 1.0 | NA | NA | NA | NA |
| | Exceed 1018 | 0.918 | 1.0 | NA | NA | NA | NA |
| | DOW ™ LDPE 501I | 0.921 | 1.9 | NA | NA | NA | NA |
| Ionomer | SURLYN ™ 1650SB | 0.940 | 1.8 | NA | NA | NA | NA |
| Ethylene vinyl acetate | EVA | 0.950 | 6.0 | NA | NA | NA | NA |
| Polybutene-1 | Toppyl PB 8640M | 0.906 | 1.0 | NA | NA | NA | NA |
| Additive | CONPOL ™ 13B | 1.01 | 7.5 | NA | NA | NA | NA |

*$I_2$ is reported for all polymers except for the propylene-based polymer for which melt flow rate is reported.

DS6D81 is a random copolymer polypropylene commercially available from Braskem. D115A is a propylene homopolymer commercially available from Braskem. Exceed 1018 is an ethylene/1-hexene copolymer commercially available from ExxonMobil. The other polyethylenes are each available from The Dow Chemical Company. The ethylene vinyl acetate (EVA) is an ethylene vinyl acetate copolymer comprising 28 weight percent vinyl acetate based on the total weight of the copolymer. Toppyl PB 8640M is a random copolymer of butene-1 with low ethylene content and is commercially available from LyondellBasell. SURLYN™ 1650SB is an ionomer of a copolymer of ethylene and acrylic acid with zinc is the metal used to neutralize the acid, and is commercially available from The Dow Chemical Company. CONPOL™ 13B is an anti-block additive commercially available from The Dow Chemical that comprises 12.5% by weight of an anti-blocking agent in an ethylene/methacrylic acid carrier resin.

VERSIFY™ 3000 and VERSIFY™ 2000 are propylene-based polymers that are copolymers of propylene and ethylene and commercially available from The Dow Chemical Company. RCPP-1 is a propylene-based polymer that is a random copolymer of propylene and ethylene that is made as described below.

Viscosity data for the various polypropylenes are provided in Table 2:

TABLE 2

| Product Name | Viscosity at 0.1 s$^{-1}$ | Viscosity at 100 s$^{-1}$ | Viscosity ratio 0.1 s$^{-1}$/100 s$^{-1}$ | DMS viscosity T (° C.) |
|---|---|---|---|---|
| VERSIFY ™ 3000 | 4278 | 577 | 7.4 | 190 |
| VERSIFY ™ 2000 | 9615 | 1049 | 9.2 | 190 |
| RCPP-1 | 4579 | 520 | 8.8 | 190 |

TABLE 2-continued

| Product Name | Viscosity at 0.1 s$^{-1}$ | Viscosity at 100 s$^{-1}$ | Viscosity ratio 0.1 s$^{-1}$/100 s$^{-1}$ | DMS viscosity T (° C.) |
|---|---|---|---|---|
| DS6D81 | 4631 | 667 | 6.9 | 190 |
| D115A | 1408 | 323 | 4.4 | 220 |

Polymerization of PP-1

A continuous solution polymerization was carried out in a controlled well-mixed reactor. Purified mixed alkanes solvent (ISOPAR E available from Exxon Mobil, Inc.), ethylene, propylene, and hydrogen (where used) were combined and fed to a 52 gallon reactor. The feeds to the reactor were measured by mass-flow controllers. The temperature of the feed stream was controlled by use of a cooled heat exchanger before entering the reactor. The catalyst component solutions were metered using pumps and mass flow meters. The reactor was run liquid-full at approximately 550 psig pressure. Upon exiting the reactor, water and additive were injected into the polymer solution to terminate remaining polymerization reactions. The solvent and unreacted monomers were removed during a two stage devolatization process of the post reactor, polymer solution process. The polymer melt was pumped to a die for underwater pelletization. Further details are described in Tables 3 and 4 below.

TABLE 3

| Polymerization Conditions for RCPP-1 | | | | | | | |
|---|---|---|---|---|---|---|---|
| | C3 Propylene lb/hr | C2 Ethylene lb/hr | Mixed Alkanes Solvent lb/hr | H sccm[1] | Temp. ° C. | Cat.[2] Conc. ppm | Cat. Flow lb/hr |
| RCPP-1 | 360 | 5.4 | 885 | 800 | 125 | 40 | 0.69 |

TABLE 4

| Polymerization Conditions for RCPP-1 | | | | | | | | |
|---|---|---|---|---|---|---|---|---|
| | Cocat-1[5] Conc. ppm | Cocat 1 Flow lb/hr | Cocat 2[6] Conc. ppm | Cocat 2 Flow lb/hr | Polym. Rate[7] lb/hr | Conv[3] wt % | Polymer wt % | Eff[4] |
| RCPP-1 | 400 | 0.60 | 400 | 0.32 | 240 | 66.6 | 19.2 | 8.7 |

Footnotes for Table 3 and Table 4:

[1] Standard cm$^3$/min.

[2] Catalyst [[2',2'''-[1,2-cyclohexanediylbis(methyleneoxy-κO)]bis[3-(9H-carbazol-9-yl)-5-methyl[1,1'-biphenyl]-2-olato-κO]](2-)]hafnium dimethyl.

[3] Weight percent propylene conversion in reactor.

[4] Efficiency, 1,000,000 lb polymer/lb Hf.

[5] Cocatalyst-1 (Cocat 1): bis-hydrogenated tallow alkyl methylammonium tetrakis-pentafluorophenyl borate (from Boulder Scientific).

[6] Cocatalyst-2 (Cocat 2): modified methaluminoxane (MMAO-3A, from Akzo-Nobel).

[7] Polymerization Rate.

The following Inventive Compositions (Inventive Comp.) and Comparative Compositions (Comparative Comp.) are prepared from the above materials:

TABLE 5

| Example | Composition |
|---|---|
| Inventive Comp. 1 | 55.5 wt. % SURLYN ™ 1650SB<br>22 wt. % EVA<br>2.5 wt. % CONPOL ™ 13B<br>20 wt. % VERSIFY ™ 3000 |
| Inventive Comp. 2 | 55.5 wt. % SURLYN ™ 1650SB<br>22 wt. % EVA<br>2.5 wt. % CONPOL ™ 13B<br>20 wt. % VERSIFY ™ 2000 |
| Inventive Comp. 3 | 55.5 wt. % SURLYN ™ 1650SB<br>22 wt. % EVA<br>2.5 wt. % CONPOL ™ 13B<br>20 wt. % RCPP-1 |
| Comparative Comp. A | 55.5 wt. % SURLYN ™ 1650SB<br>22 wt. % EVA<br>2.5 wt. % CONPOL ™ 13B<br>20 wt. % DOW ™ DMDA-8904 |
| Comparative Comp. B | 55.5 wt. % SURLYN ™ 1650SB<br>22 wt. % EVA<br>2.5 wt. % CONPOL ™ 13B<br>20 wt. % ELITE ™ 5960 |
| Comparative Comp. C | 55.5 wt. % SURLYN ™ 1650SB<br>22 wt. % EVA<br>2.5 wt. % CONPOL ™ 13B<br>20 wt. % DOWLEX ™ 2045G |
| Comparative Comp. D | 55.5 wt. % SURLYN ™ 1650SB<br>22 wt. % EVA<br>2.5 wt. % CONPOL ™ 13B<br>20 wt. % Exceed 1018 |
| Comparative Comp. E | 55.5 wt. % SURLYN ™ 1650SB<br>22 wt. % EVA<br>2.5 wt. % CONPOL ™ 13B<br>20 wt. % DOW ™ LDPE 501I |
| Comparative Comp. F | 55.5 wt. % SURLYN ™ 1650SB<br>22 wt. % EVA<br>2.5 wt. % CONPOL ™ 13B<br>20 wt. % DS6D81 |
| Comparative Comp. G | 55.5 wt. % SURLYN ™ 1650SB<br>22 wt. % EVA |

TABLE 5-continued

| Example | Composition |
|---|---|
| | 2.5 wt. % CONPOL ™ 13B<br>20 wt. % D115A |
| Comparative Comp. H | 55.5 wt. % SURLYN ™ 1650SB<br>22 wt. % EVA<br>2.5 wt. % CONPOL ™ 13B<br>20 wt. % Toppyl PB 8640M |

Compounding

The Inventive and Comparative Compositions in Table 5 are prepared using the following compounding process. The compounding process (melt blending of different resins) is performed on Coperion ZSK 26 twin screw extruder to make a composition of the ionomer, ethylene vinyl acetate (EVA), and propylene-based polymer. 2.5 wt % of CONPOL™ 13B is also added during compounding. The barrel length of the extruder per section is 100 mm with 15 sections comprising the entire extruder. The screw diameter is 25.5 mm with a flight depth of 4.55 mm. The feed rate is 20 lbs/hr and screw operates at 300 revolutions per minute. The melt pressure is 330~350 psi and the melt temperature is from 205~215° C. The extruded strand (extrudate) is passed through a water bath and then pelletized. The pelletized material is purged with nitrogen overnight for drying, and then sealed and stored in a plastic lined paper bag. The finished Compositions are then formed into films using the following film fabrication process.

Film Fabrication and Lamination

Two-layer films, with each film including a bulk layer and a sealant layer, are fabricated via a Labtech blown film Line. The total gauge of the film is 2 mil with a sealant layer of 0.4 mil which is run in the inside of the bubble during blown film process. The sealant layer consists of the specified Inventive Composition or Comparative Composition made as described above. The bulk layer is made from AFFINITY™ PL 1880G polyolefin plastomer (The Dow Chemical Company) and is 1.6 mil in thickness. The melt temperature is 200~210° C. The outside bulk layer of AFFINITY™ 1880G underwent corona treatment during the blown film process. A two-layer coextruded film is made using each of the Inventive and Comparative Compositions described above.

Each of the two-layer coextruded films is then laminated to an oriented polyethylene-terephthalate film (OPET, 12 um in thickness) via Labo Combi Laminating Coater. An adhesive of ADCOTE™ 577 (The Dow Chemical Company) is applied to the surface of the bulk layer (AFFINITY™ PL 1880G) to bond the two-layer coextruded film to the OPET. The adhesive is applied at a weight of 1.7-3.0 lbs/ream. The nip and web temperatures are 120° F., and the line speed is 100 feet per minute. The samples are cured for 4 days before heat seal test was performed.

Fabrication of blown or cast films using Comparative Composition H (with polybutene-1) can result in a high possibility of gauge band formation (defect or quality issue) during film fabrication.

Heat Seal Strength Test

The heat seal strengths of the films are tested according to ASTM Method F88. The sealant side of the OPET-laminated coextruded film (the side using the specified Inventive or Comparative Composition) is sealed with a dwell time of 0.5 seconds under a sealing pressure of 40 psi at four different sealing temperatures: 104, 121, 150, and 177° C. The sealed specimen is aged (23° C., 50% relative humidity) overnight and then cut into strips with one inch in width in the machine direction of the multilayer film. The strips are then pulled on the Instron machine at a rate of 10 in/m under the holding method of Technique A described in ASTM F88. The peak load and displacement at failure averaged from five replicate test specimens are recorded. The results are shown in Table 6.

TABLE 6

| Composition Used in Sealant Layer of Film | Peel Modifier Used in the Composition | Seal strength at seal temperature of 120° C. (lb/in) | Seal strength at seal temperature of 150° C. (lb/in) | Seal strength at seal temperature of 177° C. (lb/in) | Delta of seal strength at seal temperature of 177° C. and 120° C. (lb/in) | Displacement for complete separation of sealed area at seal temperature of 120, 150 or 177° C. (in) |
|---|---|---|---|---|---|---|
| Inventive Examples | | | | | | |
| Inventive Comp. 1 | VERSIFY ™ 3000 | 0.696 | 0.799 | 0.991 | 0.295 | <0.6 |
| Inventive Comp. 2 | VERSIFY ™ 2000 | 0.783 | 0.867 | 0.965 | 0.182 | <0.6 |
| Inventive Comp. 3 | RCPP-1 | 0.594 | 0.731 | 0.854 | 0.260 | <0.6 |
| Comparative Examples | | | | | | |
| Comparative Comp. A | DOW ™ DMDA-8904 | 0.966 | 1.456 | 3.154 | 2.188 | >0.6 |
| Comparative Comp. B | ELITE ™ 5960 | 0.929 | 1.1425 | 1.994 | 1.065 | <0.6 |
| Comparative Comp. C | DOWLEX ™ 2045G | 1.867 | 6.720 | 7.878 | 6.011 | <0.6 |
| Comparative Comp. D | Exceed 1018 | 3.105 | 6.541 | 7.861 | 4.756 | <0.6 |
| Comparative Comp. E | DOW ™ LDPE 501I | 1.495 | 1.987 | 2.258 | 0.763 | >0.6 |
| Comparative Comp. F | DS6D81 | 0.711 | 0.938 | 0.915 | 0.204 | >0.6 |
| Comparative Comp. G | D115A | 0.6045 | 0.7875 | 0.9523 | 0.350 | >0.6 |
| Comparative Comp. H | Toppyl PB 8640M | 0.7525 | 0.8038 | 0.8818 | 0.129 | <0.6 |

The films made using the Inventive Compositions advantageously demonstrate heat seal strengths at seal temperatures of 120, 150 and 177° C. of less than 1.0 pound per inch, which indicates that the Inventive Compositions provided a peelable seal. The films made using the Inventive Compositions also advantageously demonstrate a delta of seal strength (difference in heat seal strengths) between seal temperatures of 177 and 120° C. less than 0.3 lb/in, which indicates that the Inventive Compositions provided a peelable seal at both low and high seal temperatures (consistent peel strength at different temperatures). The films made using the Inventive Compositions also advantageously demonstrate displacement for complete separation of sealed area at seal temperatures of 120, 150 or 177° C. of less than 0.6 inch, which indicates a clean peel (minimal string formation during peeling process).

That which is claimed:

1. A composition comprising:

(a) an ionomer that is an acid copolymer comprising ethylene and at least one of acrylic acid and methacrylic acid, wherein a portion of the acid groups in the acid copolymer are neutralized by metal ions and are carboxylic acid salts, and wherein the acid copolymer, prior to neutralization of acid groups by metal ions, comprises 5 to 30 weight percent of acrylic acid and methacrylic acid;

(b) an ethylene/unsaturated ester copolymer comprising ethylene vinyl acetate, ethylene acrylate, or a combination thereof; and (c) a propylene-based polymer comprising a copolymer of propylene and a comonomer comprising ethylene, butene, hexene, or octene, wherein the propylene-based polymer has a molecular weight distribution (MWD) of less than 3.0, and a viscosity ratio, viscosity at 0.1 $s^{-1}$/viscosity at 100 $s^{-1}$, of greater than 7.0, wherein the viscosities are dynamic complex viscosities measured by dynamic mechanical spectroscopy at frequencies 0.1 s-1 and 100 s-1, at a temperature of 190° C.

2. The composition of claim 1, wherein the propylene-based polymer has a melting point ($T_m$) of greater than 125° C.

3. The composition of claim 1, wherein the propylene-based polymer is a copolymer of propylene and ethylene, and wherein the ethylene content in the propylene-based polymer is less than 5 weight percent.

4. The composition of claim 1, wherein the metal ion used to neutralize the acrylic acid or methacrylic acid in the ionomer comprises zinc, sodium, lithium, magnesium, or a combination thereof.

5. The composition of claim 1, wherein from 10 to 60 percent of the total acrylic acid and methacrylic acid groups of the acid copolymer, based on the total number of acid groups of the acid copolymer, are neutralized by the metal ion.

6. The composition of claim 1, wherein the ethylene/unsaturated ester copolymer is ethylene vinyl acetate, and the ethylene vinyl acetate comprises 8 to 30 weight percent vinyl acetate.

7. The composition of claim 1, wherein the ethylene/unsaturated ester copolymer is ethylene acrylate, and the ethylene acrylate comprises 8 to 25 weight percent acrylate.

8. The composition of claim 1, wherein the propylene-based polymer has a melt flow rate of 0.5 to 30 g/10 minutes.

9. The composition of claim 1, wherein the composition comprises 40 to 70 weight percent of the ionomer based on the total weight of the composition.

10. The composition of claim 1, wherein the composition comprises 10 to 40 weight percent of the ethylene/unsaturated ester copolymer based on the total weight of the composition.

11. The composition of claim 1, wherein the composition comprises 5 to 30 weight percent of the propylene-based polymer based on the total weight of the composition.

12. The composition of claim 1, wherein the ratio of the weight percent of ionomer in the composition to the weight percent of the propylene-based polymer in the composition is 1.3 to 15.0.

13. A multilayer film, wherein at least one layer of the film comprises the composition according to claim 1.

14. An article comprising the multilayer film of claim 13.

* * * * *